US005643384A

United States Patent [19]

Okabe

[11] Patent Number: 5,643,384

[45] Date of Patent: Jul. 1, 1997

[54] METHOD OF MANUFACTURING MOLDED GOODS USING PAPER OR PULP SHEETS AS MATERIAL

[75] Inventor: Masaaki Okabe, Nagoya, Japan

[73] Assignee: Okabe Engineering Kabushiki Kaisha, Nagoya, Japan

[21] Appl. No.: 370,329

[22] Filed: Jan. 10, 1995

[30] Foreign Application Priority Data

Jul. 4, 1994 [JP] Japan .................................... 6-176117

[51] Int. Cl.$^6$ .................................. B31F 1/20; B31F 1/24; B31F 1/32; B32B 31/08

[52] U.S. Cl. .......................... 156/206; 156/207; 156/222; 156/224; 156/243; 156/245; 156/253; 156/267; 156/269; 156/291; 156/306.6

[58] Field of Search .................................... 156/224, 253, 156/205–208, 222, 199, 290–291, 295, 252, 267, 269, 306.6, 309.6, 245, 243, 307.7, 324; 162/114, 117, 132, 223–224; 493/63, 82, 84, 110, 114, 148–150, 152–154, 341–342, 346, 363, 381, 393, 465; 229/120.011, 920, 235

[56] References Cited

FOREIGN PATENT DOCUMENTS 57-3492 1/1982 Japan .

*Primary Examiner*—Adrienne C. Johnstone
*Attorney, Agent, or Firm*—Wenderoth, Lind & Ponack

[57] ABSTRACT

A method of manufacturing molded goods includes using paper and pulp sheets as materials for forming a plurality of molded goods at one time using a press molding machine. A plurality of predetermined molding sections of the paper or pulp sheet is subjected to press molding. The upper and lower forming dies of the press molding machine are respectively equipped with a plurality of cores and cavities which correspond in shape to the mold goods in number and shape. Quasi-broken portions are provided between a plurality of adjacent predetermined molding sections before the paper or pulp sheet is subjected to heating and pressing by the press molding machine for molding.

16 Claims, 14 Drawing Sheets

METHOD OF MANUFACTURING MOLDED GOODS USING PAPER OR PULP SHEETS AS MATERIAL

BACKGROUND OF THE INVENTION

The present invention relates to a method of manufacturing molded goods using paper or a pulp sheet as material.

It is intended to prevent the generation of cracks in the molded goods particularly in the case of forming a plurality of molded goods at once by corrugating the paper or pulp sheet in cross section in advance before molding and then subjecting the corrugated paper or pulp sheet to heating and pressing.

Food tray or cushioning media for packages made of plastics such as foamed plastics or vinyl chloride resin are used world-wide.

Molded goods of plastics have many advantages including low cost, mass productivity, light weight, elegant appearance and the like.

Plastic products which are now under investigation and development with respect to the disposal and re-use thereof, however, have still many unsolved problems and no practical solution has been reached yet.

Accordingly, the plastic products of this kind cause a great environmental problem in the world.

As a result, the development of substitutes for the plastic products is demanded.

Among them, a pulp molding method is known as a technology developed in this industrial field.

This method, as well known, makes use of waste-paper as material, which is molded and died in various shapes depending on its use.

The processes involved in this manufacturing method can be roughly classified into a molding process and drying process.

Explaining a general manufacturing process, the molding process comprises the steps of attaching a metallic forming die to the surface of a cylindrical drum, covering the surface of the die with a metal net, and soaking the drum in pulp and producing a vacuum inside the drum to laminate the pulp material on the surface of the die so as to obtain a pulp molded good which is the same as the die in shape.

Thereafter the molded good which is still in a wet state is subjected to the drying process to obtain a final product.

Since the product has an advantage of reusing the material or being easily incinerated, it is used in some industrial fields.

For example, it is used for a darkish cushioning medium to pack eggs therein or a cushioning medium to transport vegetables and fruits therein as often seen in supermarkets.

This manufacturing method, however, has problems such as taking a comparatively long time in manufacturing because of the drying process indispensable thereto, being limited in thickness of product (about 1 to 2 mm) because of the method of laminating pulp on the surface of the die, being not rigid, being inferior in waterproofness, being inferior in appearance and requiring a forming die having a complicated shape and moreover being very expensive in manufacturing the forming die, so that it is limited in use and consequently has not come into wide use.

Besides the pulp molding method, there is an invention disclosed in Japanese Patent Publication No. 1114380.

It is a method of manufacturing molded goods employing as the material a sheet of paper impregnated with resin powders therein, wherein the molded goods are obtained by subjecting corrugated molding paper which has been corrugated by a corrugator to heating and pressing.

The resulting product is excellent in strength and is advantageous compared with the molded good made of pulp.

Particularly in the case of using paper as the material, the paper cannot be prevented from being broken or cracked when it is subjected to heating and pressing since the paper is inferior in ductility and malleability as is commonly known.

Accordingly, a corrugated portion is provided in the material before molding according to the aforementioned invention to shrink the material, thereby providing the ductility and malleability required for molding so as to make the molding feasible.

This method, however, still has the following problems.

Since it uses as its material molding paper which is made from pulp solution impregnated with heat-hardening resin powders and cannot use paper on the market as it is, it becomes expensive in material cost causing an economical drawback.

Moreover, the heat-hardening resin powders mixed therein cause a problem in incineration.

Although the specification teaches that there occurs no problem in forming a plurality of molded goods, cracks were generated in molded goods in the experiment of the present inventor.

The prior art provides a so-called "relief" at a portion of the forming die to prevent the generation of cracks in the molded goods in manufacturing the same.

As a result, it caused the generation of wrinkles at the portion of the molded good corresponding to the relief of the forming die.

Moreover, the drawing depth was limited at most to that of a lunch box or the like and it was impossible to manufacture a cushioning medium having a complicated form for an industrial package (e.g. a cushioning medium for an acoustic device inside a package).

The present invention aims to solve the aforementioned problems of the prior art.

It is a first object of the present invention to obtain crackless molded goods in manufacturing a plurality of molded goods at one time.

It is a second object of the present invention to obtain molded good which are easily burnable and re-usable.

It is a third object of the present invention to enable the manufacturing of molded goods having complex shapes and deep drawings (i.e. deep cross-sectional shapes which, to be formed by press molding, must be deeply drawn).

Moreover, other advantages and features of the present invention will become clear by the following description with reference to the drawings.

SUMMARY OF THE INVENTION

Terms peculiar to the specification used therein will be defined hereinafter for convenience of explanation of the present invention.

A term "molding paper" means paper used for manufacturing the molded goods of the present invention.

A term "molding pulp sheet" means a sheet-type pulp used for manufacturing the molded goods of the present invention.

A term "molding corrugated paper" means molding paper which is provided with a corrugated portion such as that of a corrugated board, the corrugated portion being formed by a corrugator and being unrestorable to its original shape at the normal temperature.

A term "predetermined molding section" means a section which is not subjected to molding yet but is expected to be subjected to molding when molding corrugated paper, a molding corrugated pulp sheet or a molding pulp sheet is subjected to heating and pressing in manufacturing the molded good.

A term "quasi-broken portion" refers to a portion provided between adjacent predetermined molding sections, the portion being not broken in a normal state but being broken first by molding stress at the time of molding in the case that the molded good is going to be broken. The quasi-broken portion is formed by holes or perforations arranged at intervals.

In other words, the quasi-broken portion is a portion arranged around the predetermined molding section to be eventually broken at the time of heating and pressing.

A term "molded piece" is a molded portion having a surplus portion left therearound after being subjected to heating and pressing in the forming die. Molded goods are obtained by trimming off the surplus portion of the molded piece from the molded portion thereof.

The aforementioned terms "quasi-broken portion", "predetermined molding section", "molded piece", "molding corrugated paper", "molding corrugated pulp sheet" and "molding pulp sheet" are used in the specification under the definitions set forth above so far as no explanatory note is made.

The summary of the invention is as follows.

A method of manufacturing molded goods using paper as the material for forming a plurality of the molded goods at one time by way of press molding, comprises the steps of:

preparing molding corrugated paper provided with a plurality of corrugated portions therein in cross section, the cross section being unrestorable to its original shape at the normal temperature, forming quasi-broken portions among a plurality of predetermined molding sections of the molding corrugated paper before molding, the predetermined molding sections being expected to be subjected to molding, subjecting at least a sheet of molding corrugated paper to molding by way of heating and pressing using a pressing machine, the molding corrugated paper having the quasi-broken portions formed therein, and trimming the molded portion at the periphery thereof.

A method of manufacturing molded goods using a pulp sheet as the material for forming a plurality of the molded goods at one time by way of press molding, comprises the steps of:

preparing a molding corrugated pulp sheet provided with a plurality of corrugated portions in cross section, the cross section being unrestorable to its original shape at the normal temperature, forming quasi-broken portions among a plurality of predetermined molding sections of the molding corrugated pulp sheet before molding, the predetermined molding sections being expected to be subjected to molding, subjecting at least a molding corrugated pulp sheet to molding by way of heating and pressing using a pressing machine, the molding corrugated pulp sheet having the quasi-broken portions formed therein, and trimming the molded portion at the periphery thereof.

A method of manufacturing molded goods using a pulp sheet as the materials for forming a plurality of the molded goods at one time by way of press molding, comprises the steps of:

forming quasi-broken portions among a plurality of predetermined molding sections of the molding corrugated pulp sheet before molding, the predetermined molding sections being expected to be subjected to molding, subjecting at least a molding corrugated pulp sheet to molding by way of heating and pressing using a pressing machine, the molding corrugated pulp sheet having the quasi-broken portions formed therein, and trimming the molded portion at the periphery thereof.

A method of manufacturing molded goods using a paper sheet and a pulp sheet as the materials for forming a plurality of the molded goods at one time by way of press molding, comprises the steps of:

preparing molding paper and a molding pulp sheet, each provided with a plurality of corrugated portions in cross section, the cross section being unrestorable to its original shape at the normal temperature, laminating the molding corrugated pulp sheet on the molding corrugated paper, forming quasi-broken portions among a plurality of predetermined molding sections of the molding corrugated pulp sheet and the molding corrugated paper before molding, the predetermined molding sections being expected to be subjected to molding, subjecting the molding corrugated pulp sheet and the molding corrugated paper to molding by way of heating and pressing using a pressing machine, the molding corrugated pulp sheet and molding corrugated paper each having the quasi-broken portions formed therein, and trimming the molded portions of the molding corrugated pulp sheet and molding corrugated paper at the peripheries thereof.

A method of manufacturing molded goods using a paper sheet and a pulp sheet as the materials for forming a plurality of the molded goods at one time by way of press molding, comprises the steps of:

preparing molding paper and a molding pulp sheet, each provided with a plurality of corrugated portions in cross section, the cross section being unrestorable to its original shape at the normal temperature, laminating the molding corrugated paper on the molding corrugated pulp sheet, forming quasi-broken portions among a plurality of predetermined molding sections of the molding corrugated paper and the molding corrugated pulp sheet before molding, the predetermined molding sections being expected to be subjected to molding, subjecting the molding corrugated paper and the molding corrugated pulp sheet to molding by way of heating and pressing using a pressing machine, the molding corrugated paper and molding corrugated pulp sheet each having the quasi-broken portions formed therein, and trimming the molded portions of the molding corrugated paper and molding corrugated pulp sheet at the peripheries thereof.

A method of manufacturing molded goods using a pulp sheet as the material for forming a plurality of the molded goods at one time by way of press molding, comprises the steps of:

laminating one corrugated pulp sheet on another corrugated pulp sheet, each corrugated pulp sheet being provided with a plurality of corrugated portions in cross section and the cross section being unrestorable to its original shape at the normal temperature, forming quasi-broken portions among a plurality of predetermined molding sections of the upper and lower molding corrugated pulp sheets before molding, the predetermined molding sections being expected to be subjected to molding, subjecting the upper and lower molding corrugated pulp sheets to molding by way of heating and pressing using a pressing machine, each molding corrugated pulp sheet having the quasi-broken portions formed therein, and trimming the molded portions of the upper and lower molding corrugated pulp sheets at the peripheries thereof.

A method of manufacturing molded goods using a paper sheet and a pulp sheet as the materials for forming a plurality of the molded goods at one time by way of press molding, comprises the steps of:

preparing molding paper and a molding pulp sheet, each provided with a plurality of corrugated portions in cross section, the cross section being unrestorable to its original shape at the normal temperature, laminating the molding corrugated paper and the molding corrugated pulp sheet with a plastic film therebetween, forming quasi-broken portions among a plurality of predetermined molding sections of the molding corrugated paper, the molding corrugated pulp sheet and the plastic film before molding, the predetermined molding sections being expected to be subjected to molding, subjecting the molding corrugated paper, the molding corrugated pulp sheet and the plastic film to molding by way of heating and pressing using a pressing machine, each of the molding corrugated paper, the molding corrugated pulp sheet and the plastic film having the quasi-broken portions formed therein, and trimming the molded portions of the molding corrugated paper, the molding corrugated pulp sheet and the plastic film at the peripheries thereof.

A method of manufacturing molded goods using a paper sheet and a pulp sheet as the materials for forming a plurality of the molded goods at one time by way of press molding, comprises the steps of:

preparing molding paper and a molding pulp sheet, each provided with a plurality of corrugated portions in cross section, the cross section being unrestorable to its original shape at the normal temperature, laminating the molding corrugated pulp sheet and the molding corrugated paper with a plastic film therebetween, laminating another plastic film on the molding corrugated pulp sheet, forming quasi-broken portions among a plurality of predetermined molding sections of the first-layer plastic film, the molding corrugated pulp sheet, the molding corrugated paper and the plastic film laminated between the molding corrugated pulp sheet and molding corrugated paper before molding, the predetermined molding sections being expected to be subjected to molding, subjecting the first-layer plastic film, the molding corrugated pulp sheet, the molding corrugated paper and the plastic film laminated between the molding corrugated pulp sheet and the molding corrugated paper to molding by way of heating and pressing using a pressing machine, each of the first-layer plastic film, the molding corrugated pulp sheet, the molding corrugated paper and the plastic film laminated between the molding corrugated pulp sheet and the molding corrugated paper having the quasi-broken portions formed therein, and trimming the molded portions of the first-layer plastic film, the molding corrugated pulp sheet, the molding corrugated paper and the plastic film laminated between the molding corrugated pulp sheet and the molding corrugated paper at the peripheries thereof.

A method of manufacturing molded goods using a paper sheet as the material for forming a plurality of the molded goods at one time by way of press molding, comprises the steps of subjecting at least a sheet of molding corrugated paper to preparatory molding by way of a pressing machine equipped with an upper die and a lower die each having clearance, the sheet being provided with a plurality of corrugated portions in cross section and the cross section being unrestorable to its original shape at the normal temperature, and subjecting the preparatory molded good to finish molding by way of a pressing machine equipped with a lower die having little clearance.

A method of manufacturing molded goods using a pulp sheet as the material for forming a plurality of the molded goods at one time by way of press molding, comprises the steps of subjecting at least a molding pulp sheet to preparatory molding by way of a pressing machine equipped with an upper die and a lower die each having clearance, the sheet being provided with a plurality of corrugated portions in cross section and the cross section being unrestorable to its original shape at the normal temperature, and subjecting the preparatory molded good to finish molding by way of a pressing machine equipped with an upper die and a lower die each having little clearance.

A method of manufacturing molded goods using a paper sheet as the material for forming a plurality of the molded goods at one time by way of press molding, comprises the step of trimming at least a sheet of molding corrugated paper at the peripheries of outlines of expected molded goods just before subjecting the same to molding by way of heating and pressing using a pressing machine, the paper being provided with a plurality of corrugated portions in cross section, the cross section being unrestorable to its original shape at the normal temperature.

A method of manufacturing molded goods using a pulp sheet as the material for forming a plurality of the molded goods at one time by way of press molding, comprises the step of trimming at least a molding corrugated pulp sheet at the peripheries of outlines of expected molded goods just before subjecting the same to molding by way of heating and pressing using a pressing machine having an upper die and a lower die, the sheet being provided with a plurality of corrugated portions in cross section, the cross section being unrestorable to its original shape at the normal temperature.

DETAILED DESCRIPTION OF THE PREFERRED EMBODIMENTS

First Embodiment

The present invention uses a molding pulp sheet and molding paper as materials.

As to the molding paper, only that provided with corrugated portions therein is employed according to this embodiment.

As to the molding pulp sheet, either a molding corrugated pulp sheet is used which has a plurality of corrugated portions therein which are unrestorable in cross section to their original shapes at the normal temperature or a molding pulp sheet having no corrugated portions.

The present invention using the molding pulp sheet or molding paper as the material for molded goods aims at enabling recycling, obtaining a given strength and being inexpensive and disposable and further reducing the steps of the manufacturing process as much as possible to improve productivity and reduce manufacturing costs.

Therefore, materials are selected according to these aims.

The inventor employed regenerated paper for commercial packages for milk, i.e., a so-called milk carton and a sheet-shaped material which makes use of the regenerated pulp thereof for study and experiment.

The inventor also experimented with nonstandard materials such as regenerated pulp obtained from paper diapers, regenerated paper and those mainly composed of regenerated pulp containing plastic strips therein.

This experiment, however, does not mean that this method exclusively makes use of regenerated paper or regenerated pulp sheets, but it is a matter of fact that this method also makes use of normal base paper or pulp available on the market.

Although the inventor employed a material in which impurities such as plastic strips remain in case of employing regenerated paper or regenerated pulp, it was confirmed that a material containing the plastic strips to the extent of about 50% did not affect shaping and quality.

The inventor also confirmed that it did not particularly affect the easiness of disposal which was a problem to be solved by the invention.

The inventor confirmed that the plastic strips melted at the time of heating and pressing to serve as a binding material for fiber groups of regenerated paper or regenerated pulp.

Accordingly, the present invention also intends to effectively make use of materials which have thus far had to be disposed of as industrial wastes so far.

Molding paper which is inferior in ductility or malleability cannot be free from being broken or from having cracks generated therein when it is employed as a material and is subjected to heating and pressing.

Figure 5:
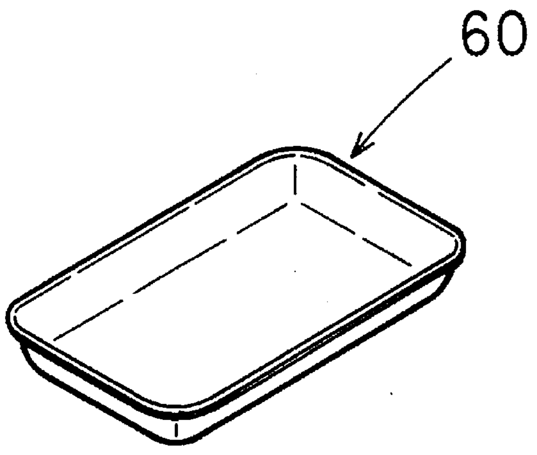
FIG. 5 is a perspective view of a product.

As a concrete example, a case of continuously forming 6 small food trays 60 (200 mm in length, 100 mm in width and 20 mm in height. Refer to FIG. 5) at a time by subjecting two, i.e., upper and lower molding pulp sheets 10 and 10 on a drum to heating and pressing by way of a pressing machine 26 will be described hereinafter.

The process in the case of employing molding paper is entirely the same as that in case of employing the molding pulp sheets 10 and 10, so that the process of the latter case will be described hereinafter and the description of the former case is omitted.

The inventor employed the molding pulp sheets 10 and 10 as a material because of the advantage of being soft in physical property and being easily shaped owing to pulp fibers arranged therein in all directions since the pulp sheet is a preparatory product of molding paper and consequently different from the same in fiber directions as well as the commercial advantage of being inexpensive in material cost.

An example of molding two comparatively thin (e.g. 2 mm) molding pulp sheets 10 and 10 laminated on each other will be described hereinafter, but the inventor also experienced with molding a food tray 60 from a molding pulp sheet 10.

As a result, the inventor obtained the same result as that of the two molding pulp sheets 10 and 10.

The inventor confirmed that molding two or more thin laminated molding pulp sheets 10 was excellent in shaping compared with molding a comparatively thick pulp sheet 10 for obtaining molded goods.

Moreover, in the case of employing molding pulp sheets 10 which sometimes comprise impurities such as plastic splinters therein, the molding pulp sheet 10 being made from regenerated paper, it is advantageous to laminate a regenerated pulp sheet comprising no impurities therein on the other pulp sheet comprising impurities therein so as to obtain molded goods having a surface with no impurities exposed.

Furthermore, in the case of employing three-layered molding pulp sheets 10 made from regenerated paper, it is advantageous to employ molding pulp sheets made from regenerated paper having no impurities on the surface thereof as the face and back layers, and a molding pulp sheet having impurities remaining therein as the intermediate layer.

The reason why two, three or more molding pulp sheets 10 laminated on one another are subjected to molding is because they have the aforementioned advantages.

On the other hand, the inventor also confirmed that a satisfactory molded good was obtained also from a comparatively thick molding pulp sheet 10 in the case where drawing is not deep at the time of molding. Therefore a molded good could be obtained from a molding pulp sheet 10 depending on the kind and use of the molded good.

Accordingly, it may be understood that the number of layers of the molding pulp sheets 10 varies depending on the kind and use of the molded good.

It is a matter of fact that the present invention does not intend to mold 6 food trays 60 at a time but fundamentally intends to mold at least two food trays 60 at a time. Molding more than 2 food trays 60 is no more than a problem of production technology which is determined by the number of so-called chamfers in a forming die.

Figure 1:
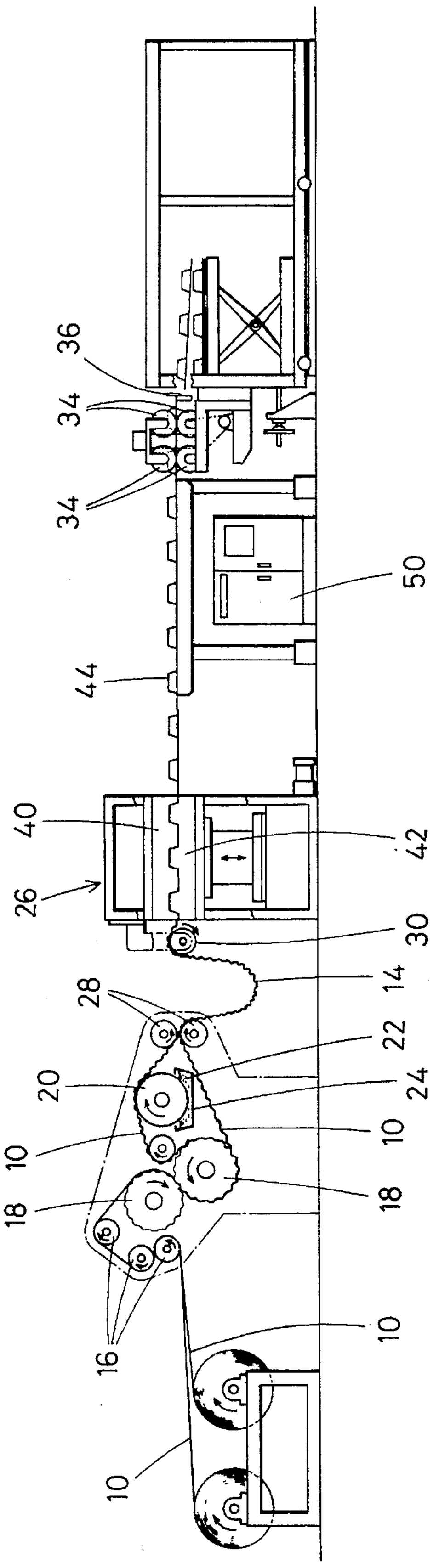
FIG. 1 is a side view of an entire device used in a manufacturing process.
Figure 3:
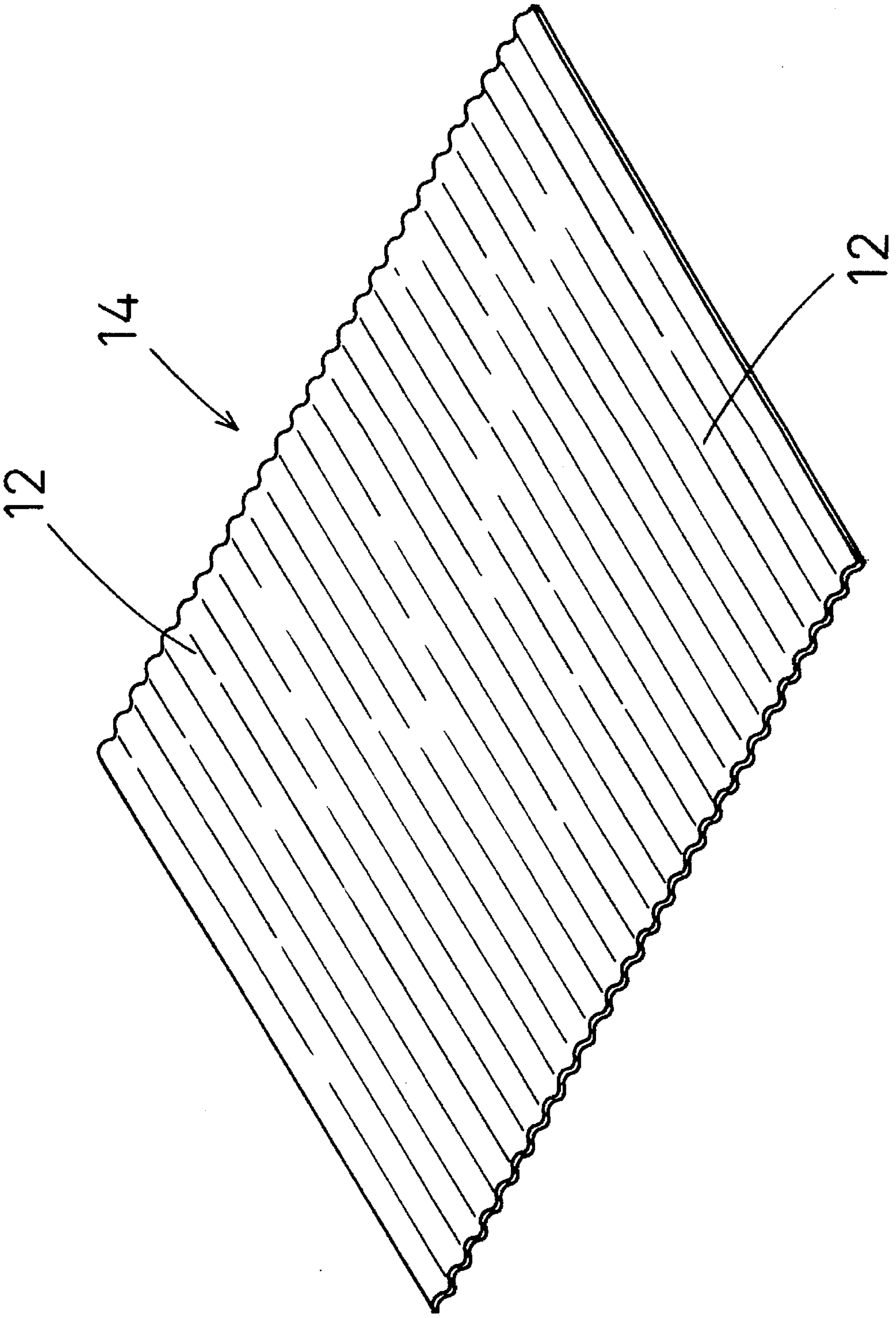
FIG. 3 is a perspective view of a molding corrugated pulp sheet.

A plurality of corrugated portions 12 corrugated in cross section are formed in series in the molding pulp sheets 10 and 10 before they are subjected to heating and pressing to facilitate molding the same to obtain a molding corrugated pulp sheet 14 (refer to FIGS. 1 and 3).

The corrugated portions 12 afford the molding pulp sheets 10 and 10 ductility and malleability.

The corrugated portions 12 which are similar to the "corrugating mediums" for manufacturing corrugated boards can be formed by bending the molding pulp sheets 10 and 10 so that they may not be restored to their original state by making use of a so-called corrugator, though the illustration of the general process is omitted.

Needless to say, it does not mean that a means for providing the corrugated portions 12 is limited to the corrugator, for they can be formed also by subjecting the molding pulp sheets 10 and 10 to press molding by way of, for example, a forming die having a corrugated surface.

The molding pulp sheets 10 and 10 which have been shrunk in length by providing the corrugated portions 12 therein are transformed into papers excellent in ductility and malleability when the molding pulp sheets 10 and 10 in the shrunk state are subjected to heating and pressing.

The molding pulp sheets 10 and 10 wound around the drum are fed to be inserted between a pair of corrugated-surface rollers 18 and 18 by way of guide rollers 16.

Thus the molding pulp sheets 10 and 10 which have passed between the corrugated-surface rollers 18 and 18 to form a plurality of corrugated portions 12 therein being unrestorable in cross section to their original shape at the normal temperature are transformed into molding corrugated pulp sheets 14 and 14.

Although it will be described in detail in another embodiment, a binding material 22 is also expected to be applied to a part of the corrugated portions 12 along the direction thereof by bringing a sheet of these two molding corrugated pulp sheets 14 and 14 into contact with a size roller 20 as necessary.

A means for applying the binding material 22 to the molding corrugated pulp sheet 14 functions as follows. The rotating size roller 20 is dipped in the binding material 22 contained in a size tank 24 at the lower portion thereof and the binding material 22 on the size roller 20 is applied to the corrugated portions 12 of the molding corrugated pulp sheet 14.

Thereafter the pair of upper and lower molding corrugated pulp sheets 14 and 14 are fed into the pressing machine 26 to be subjected to heating and pressing therein. Some contrivances for molding according to the present invention will be described hereinafter.

At first a slackening means is provided for preventing the molding corrugated pulp sheets 14 and 14 from generating cracks therein at the time of molding since the cracks are liable to be generated when the molding corrugated pulp sheets 14 and 14 are subjected to molding as they are in a strained state.

As illustrated in FIG. 1, the molding corrugated pulp sheets 14 and 14 are fed toward the pressing machine 26 by way of a pair of guide rollers 28 and 28, while they are fed by way of a tension roller 30 at the side of the pressing machine 26.

As a result, the molding corrugated pulp sheets 14 and 14 are slackened at the side of the pressing machine 26.

On the other hand, a means for slackening the molding corrugated pulp sheets 14 and 14 before molding is provided also at the side of feeding rollers 34.

According to this embodiment of the invention, the feeding rollers 34 which rotate (counterclockwise in the figure for the upper rollers and clockwise in the figure for the lower rollers) for feeding the molding corrugated pulp sheets 14 and 14 toward a cutting mechanism 36 slackens the molding corrugated pulp sheets 14 and 14 by slightly rotating the feeding rollers 34 in reverse (clockwise in the figure for the upper rollers and counterclockwise int he figure for the lower rollers) before feeding to push back the molding corrugated pulp sheets 14 and 14 toward the pressing machine 26.

Thus the molding corrugated pulp sheets 14 and 14 are slackened and introduced into the pressing machine 26.

Hereupon the molding corrugated pulp sheets 14 and 14 are subjected to heating and pressing by way of the pressing machine 26 equipped with an upper die 40 and a lower die 42, wherein further contrived devices are provided.

Figure 2:
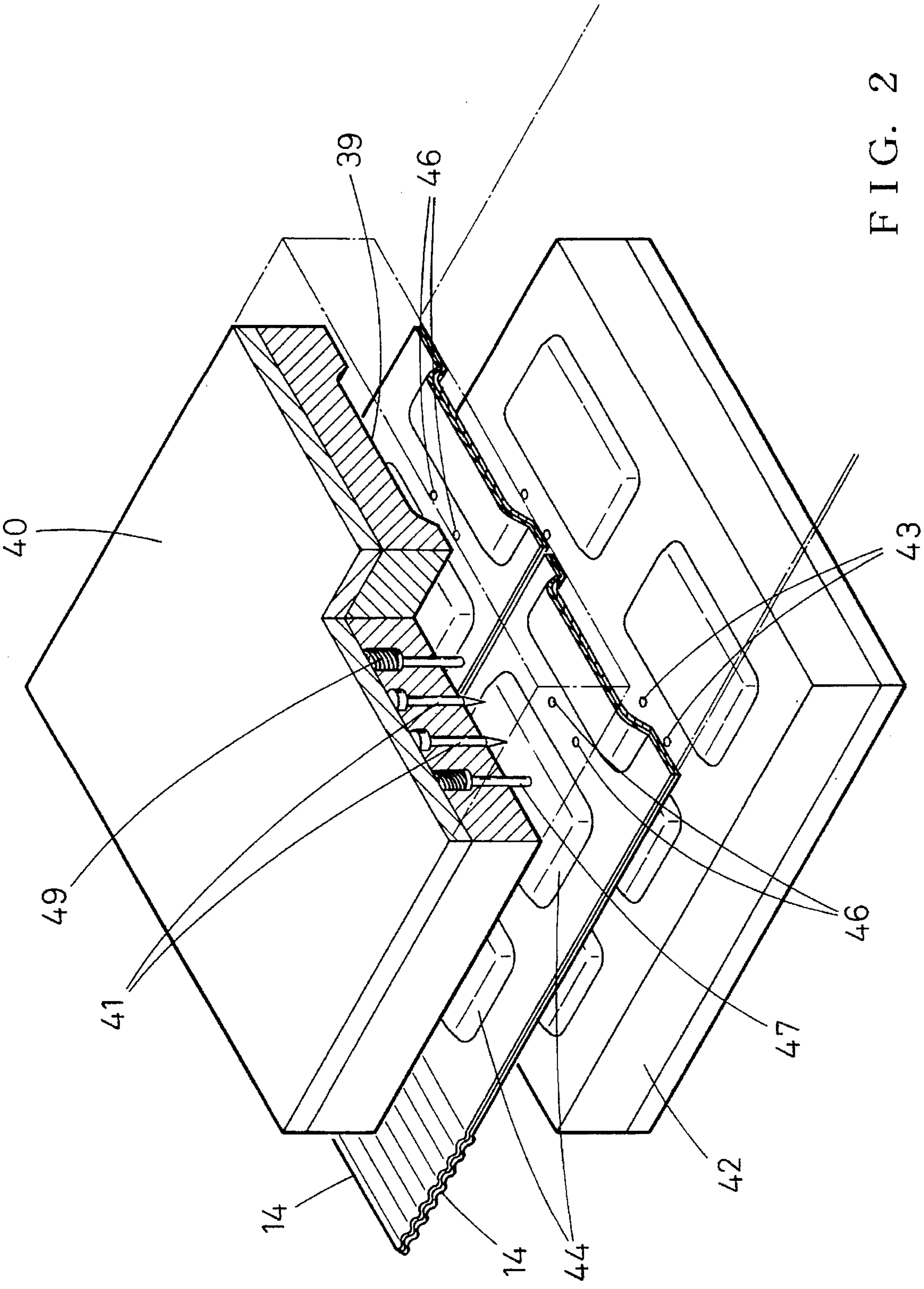
FIG. 2 is an enlarged perspective view showing an essential part of the device for the manufacturing process.
Figure 4:
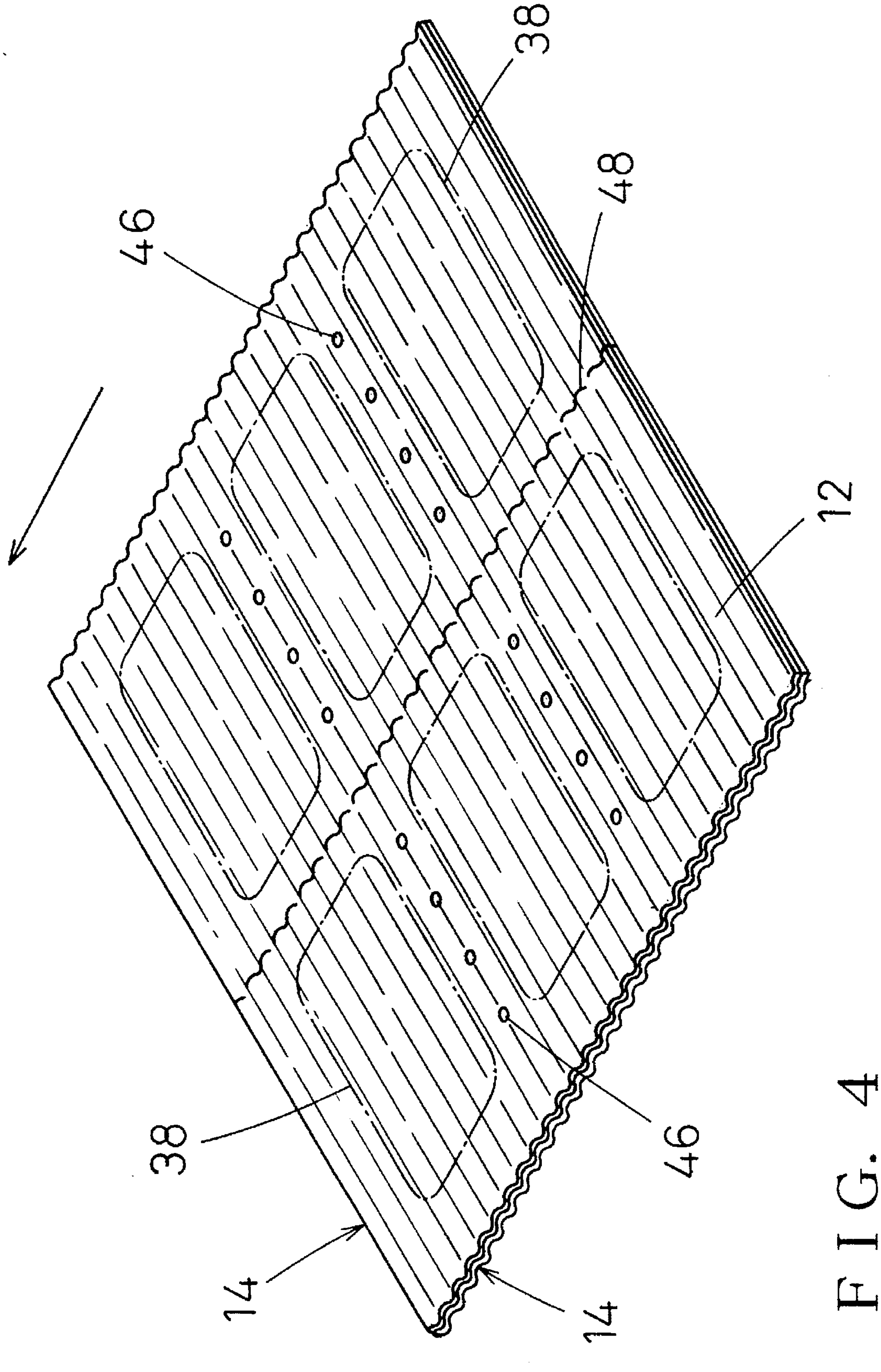
FIG. 4 is a view for describing the molding corrugated pulp sheet provided with quasi-broken portions to be broken first at the time of molding.

When the molding corrugated pulp sheets 14 and 14 are subjected to heating and pressing in this state, cracks are still liable to be generated therein, so that quasi-broken portions 46 are provided between six adjacent predetermined molding sections 38 (rectangular portions corresponding to the outlines of food trays according to this embodiment) in the molding corrugated pulp sheets 14 and 14 (refer to FIGS. 2 and 4).

For example, several small holes are provided as the quasi-broken portions 46 between the six adjacent predetermined molding sections 38 in a direction perpendicular to the feeding direction (refer to the direction of an arrow in the figure) of the molding corrugated pulp sheets 14 and 14.

In FIG. 4, the quasi-broken portions 46 are provided at both sides (left and right direction in the figure) of two predetermined molding sections 38 located at the center among the six predetermined molding sections 38.

On the other hand, it is preferable to also provide a quasi-broken portion 48 which comprise perforations made by a sewing machine needle in the feeding direction of the molding corrugated pulp sheets 14 and 14.

The inventor also plans, as an alternative, to divide the molding corrugated pulp sheets 14 and 14 into two in advance to be fed to the pressing machine 26 for molding instead of providing the quasi-broken portions 48 which extend in the feeding direction of the molding corrugated pulp sheets 14 and 14 at the central portions thereof.

Although a means for providing the quasi-broken portion 48 in the feeding direction of the molding corrugated pulp sheets 14 and 14 at the central portion thereof is not shown, the quasi-broken portions 48 may be formed therein by a sewing machine needle at the central portion thereof before or after the corrugated portions 12 are formed therein.

On the other hand, some contrivance is added also to a means for machining the quasi-broken portions 46 comprising perforations arranged in the direction perpendicular to the feeding direction of the molding corrugated pulp sheets 14 and 14.

Perforation pins 41 project toward the lower die 42 from the lower surface of the upper die 40 equipped therein with recesses 39 each corresponding in shape to each of six food trays 60.

As a result, the perforation pins 41 pierce the molding corrugated pulp sheets 14 and 14 to form perforations, i.e., the quasi-broken portions 46 therein, before the upper die 40 presses the molding corrugated pulp sheets 14 and 14 down against the lower die 42 for heating and pressing.

The quasi-broken portions 46 are formed between a plurality of adjacent predetermined molding sections 38 of a molding corrugated pulp sheet.

Small holes 43 are provided in the lower die 42 at positions respectively, confronting the tip ends of the perforation pins 41 to receive the same therein.

It is a matter of fact that the quasi-broken portions 46 and 48 are not broken to divide the molding corrugated pulp sheets 14 and 14 before molding.

In this embodiment the upper die 40 is provided with the perforation pins 41 projecting therefrom toward the lower die 42 for forming the quasi-broken portions 46 concurrently with the operation of the upper die 40 just before press molding. This is advantageous to enable machining of the quasi-broken portions 46 without resorting to another process.

The quasi-broken portions 46 comprising perforations arranged in the direction perpendicular to the feeding direction of the molding corrugated pulp sheets 14 and 14 may be formed therein making use of a quasi-broken portion machining means such as a sewing machine needle or a drill before the molding process instead of using the perforation pins 41 provided on the upper die 40 set forth above.

Forming the perforations arranged in the direction perpendicular to the feeding direction of the molding corrugated pulp sheets 14 and 14 has been described above, but it is a matter of course that the perforations may also be formed by providing the perforation pins on the lower surface of the upper die 40.

As described above, the molding corrugated pulp sheets 14 and 14 are provided with the quasi-broken portions 46 and 48 so that stress applied to the molding corrugated pulp sheets 14 and 14 by the upper and lower dies 40 and 42 at the time of heating and pressing reaches only the quasi-broken portions 46 and 48 to generate cracks therein. This is advantageous in that it completely prevents the molded pieces 44 from generating cracks therein.

The quasi-broken portions 46 and 48 may be linearly arranged between the outlines of the predetermined molding sections 38 in the case of the rectangular food tray 60, but it is preferable to provide the quasi-broken portions along the outlines of the molded goods in the case of circular or elliptic mold goods.

So-called knock pins 47 projecting toward the lower die 42 in a manner similar to the aforementioned perforation pins 41 are provided on the lower surface of the upper die 40 in a manner to be elastically forced downward by springs 49 according to the invention.

Accordingly, the knock pins 47 always press the molding corrugated pulp sheets 14 and 14 against the lower die 42 when the upper die 40 lowers toward the lower die 42.

As a result, it is possible to restrain the molding corrugated pulp sheets 14 and 14 from floating after the molding process.

That is, when the molding corrugated pulp sheets 14 and 14 are subjected to heating and pressing for molding by the pressing machine 26, it is possible to prevent the molded corrugated pulp sheets 14 and 14 from sticking to the upper die 40 and consequently being obstructed from being transferred to the next process.

When the molding corrugated pulp sheets 14 and 14 are pressed against the lower die 42 by way of the knock pins 47, the knock pins 47 are liable to injure the molding corrugated pulp sheets 14 and 14 at the tip ends thereof, so that it is advisable to press the tip ends of the knock pins 47 against portions in which flaws are negligible, i.e., against the portions outside the predetermined molding sections 38.

According to this embodiment, knock pins 47 are provided deliberately adjacent to the aforementioned perforation pins 41 to press against the portions neighboring the quasi-broken portions 46.

When the upper die 40 rises, the molding corrugated pulp sheets 14 and 14 are liable to rise with the upper die 40. Therefore, the knock pins 47 are provided to prevent the molding corrugated pulp sheets 14 and 14 from rising.

The knock pins 47 have the advantage of being able to make the molding corrugated pulp sheets 14 and 14 fit well against the surface of the lower die 42 as well as being able to restrain the molding corrugated pulp sheets 14 and 14 from floating during molding so as to more securely perform the molding by keeping the molding corrugated pulp sheets 14 and 14 pressed against the lower die 42 during the molding.

Continuing the description further, in the case of continuously molding rolled molding corrugated pulp sheets 14 and 14, the molding corrugated pulp sheets 14 and 14 have to be forcibly drawn out after one molding process for movement to the next process (toward a cutting mechanism 36).

Therein the predetermined molding sections 38 are subjected to heating and pressing to form the molded pieces 44, and then the molding corrugated pulp sheets 14 and 14 are intermittently drawn.

As a drawing means according to this embodiment, four pairs of the upper and lower feeding rollers 34 are provided in front of the cutting mechanism 36 at both sides of the molding corrugated pulp sheets 14 and 14 (two pairs are shown but the other two pairs are not in the figure), which pass between the pairs of feeding rollers 34 at both sides of the molded pieces 44 to be fed toward the cutting mechanism 36 by way of the rotation of the feeding rollers 34.

In this case, a short given time is required for molding the molding corrugated pulp sheets 14 and 14 by the forming die (e.g., 3 sec.).

Accordingly, it is necessary to intermittently draw the molding corrugated pulp sheets 14 and 14 provided with the molded pieces 44 formed therein after molding at intervals of 3 seconds.

Therefore, the feeding rollers 34 are controlled by a controller computer 50 to operate in response to the operation of the forming die.

In this way, the molding corrugated pulp sheets 14 and 14 provided with, e.g., six molded pieces 44 therein are cut by the cutting mechanism 36 in the direction perpendicular to the feeding direction to cut off every set of the molded pieces 44 therefrom.

Thereafter, the molded goods comprising food trays 60 are obtained by trimming the peripheries of the molded pieces 44 using another cutter (not shown).

Moreover, the food trays 60 need to be waterproofed at least on the inner side thereof since it packs wet foods, e.g., perishable foods, such as sea foods according to the present invention.

In this case, laminating a plastic film on the inner surface of the food tray 60 is an easy countermeasure, but if the laminated layer is thick, it causes trouble in incineration after use, running counter to the protection of the environment which is a theme of the present invention.

Furthermore, the molding corrugated pulp sheets 14 and 14 are molded by subjecting the same to heating and pressing, so that the laminated layer is in danger of melting at the time of heating.

Therefore according to the present invention, the upper die 40 is generally kept at 120° C. to 180° C. while a very thin plastic film of about Jim in thickness which is easily incinerated is laminated on paper in advance and the lower die 42 located on the side of the laminated layer is kept low in temperature, i.e., at about 60° C. to protect the laminated layer from heating at the time of molding.

Although subjecting a single sheet of molding paper, of 2 mm in thickness and provided with the corrugated portions 12 therein, to heating and pressing (refer to Japanese Patent Publication No. 1114380) is supposed to be permissible to molding, the inventor actually tested it and confirmed that it is beset by problems in some uses.

The inventor also found that even if the molding pulp sheets 10 and 10 were subjected to heating and pressing after the corrugated portions 12 were formed therein, the molding pulp sheets 10 and 10 were reduced in moldability to and cracks were generated therein during molding as they became thick.

Hereupon, the inventor prepared, for example, two molding pulp sheets 10 and 10 each of 1 mm in thickness for obtaining a molded good which was 2 mm thick in a laminated state, laminated them and subjected the same to heating and pressing. As a result, the inventor found that they could be more easily molded as a whole though he required two molding pulp sheets 10 and 10.

This is because the thinner the molding pulp sheets 10 and 10 are, the more easily the shrunk corrugated portions 12 can be stretched.

Moreover, the inventor paid attention to the fact that when the molding pulp sheets 10 and 10 were laminated before molding, each of a plurality of corrugated portions 12 thereof which were supposed to vertically overlap each other deviated a little in position from each other in the feeding direction instead of being correctly laminated.

The inventor found that the little deviation in laminating position of the corrugated portions 12 eventually resulted in high ductility and high moldability since the two corrugated portions 12 were not correctly laminated on each other and consequently were more liable to receive the pressure of the forming die.

In other words, correctly laminated corrugated portions 12 and 12 of two separated molding pulp sheets 10 and 10 substantially act as a single sheet during molding.

The processes of other embodiments each employing molding paper which has a plurality of corrugated portions therein but is made of a different material is completely common to that of this embodiment employing the molding pulp sheet 10 set forth above, the description of which is applicable to the other embodiments so that the respective descriptions thereof are omitted.

Employing the molding paper as a material is advantageous in cost, for example, in the case of making use of a large amount of waste pieces which are disposed as industrial wastes, though it has a problem of high manufacturing costs in general.

Second Embodiment

The second embodiment employs a molding pulp sheet having no corrugated portions therein as a material.

This embodiment is not fundamentally different from the first embodiment, so that only the different points therebetween will be described hereinafter because the description of the first embodiment is applicable to the remaining major portion of the second embodiment.

As described above, the molding pulp sheet has an advantage of reducing the number of steps of processing the material and consequently reducing the material cost since it is a preliminary product of the molding paper.

The molding pulp sheet is different from the molding base paper, in that it is a semi-processed material.

Fibers in the molding paper are aligned in a given direction so that the molding paper is hard to break in one direction, but is easily broken in the other direction.

To the contrary in the case of the molding pulp sheet 10, it was ascertained that the molding pulp sheet 10 was free from cracks, even if the corrugated portions 12 were omitted therefrom due to the use of the molded good after it was subjected to heating and pressing by way of the pressing machine 26, since the pulp fibers extended in all directions therein.

The fundamental method of manufacturing is common to that of the first embodiment set forth above in both the case of employing at least two molding pulp sheets and the case of employing a single molding pulp sheet, although there can be modifications depending on its use.

For example, the inventor confirmed that molded goods which are simple in shape and of a shallow drawing can be manufactured from materials having no corrugated portions (refer to FIG. 5).

Third Embodiment

Figure 7:
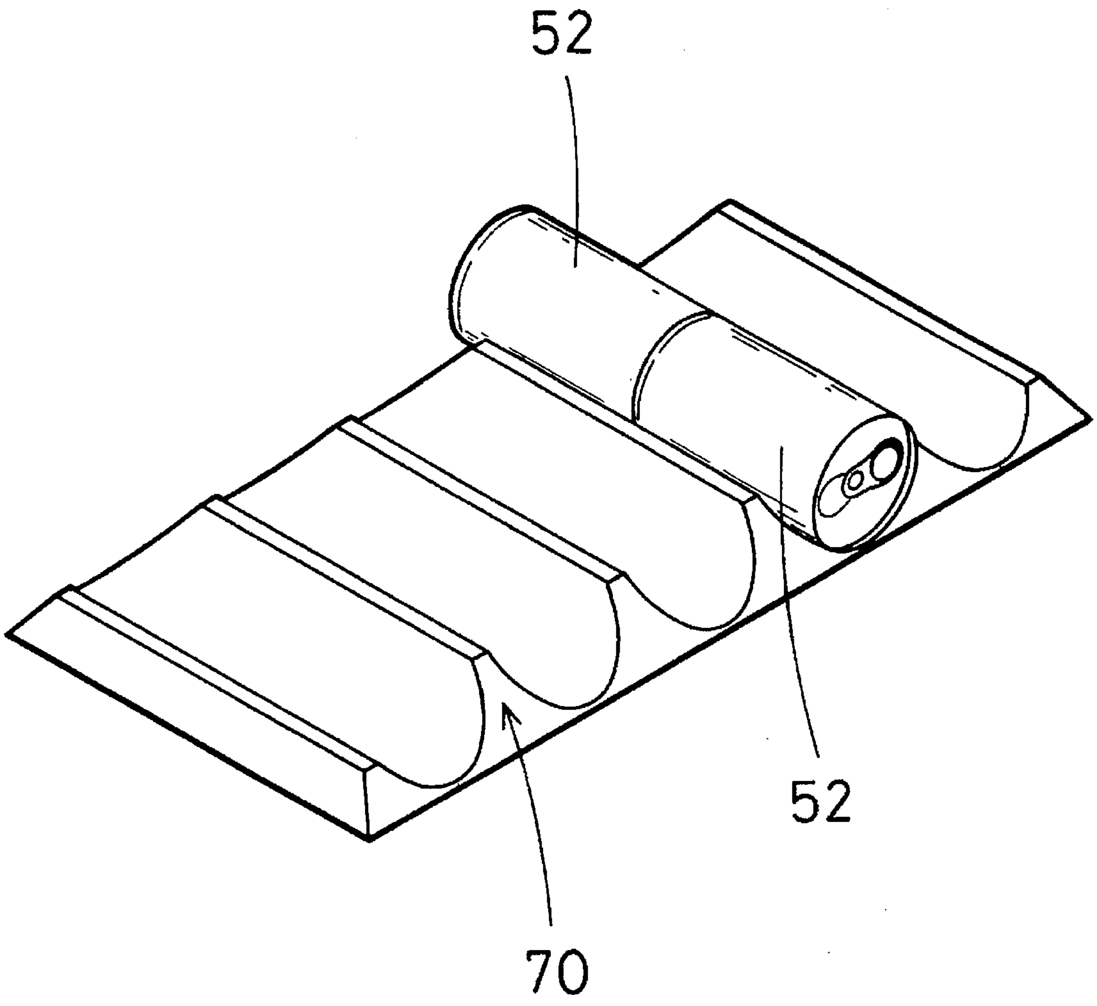
FIG. 7 is a perspective view of still another product.

This embodiment is applicable to molded goods of deeper drawing as illustrated in FIG. 7.

A molded good according to this embodiment is, for example, a cushioning medium 70 with recesses which are of about 50 mm deep for packing a tea can 52 therein.

The corrugated portions 12 are provided in the molding pulp sheet 10 similarly in that of the first embodiment described above.

Figure 8:
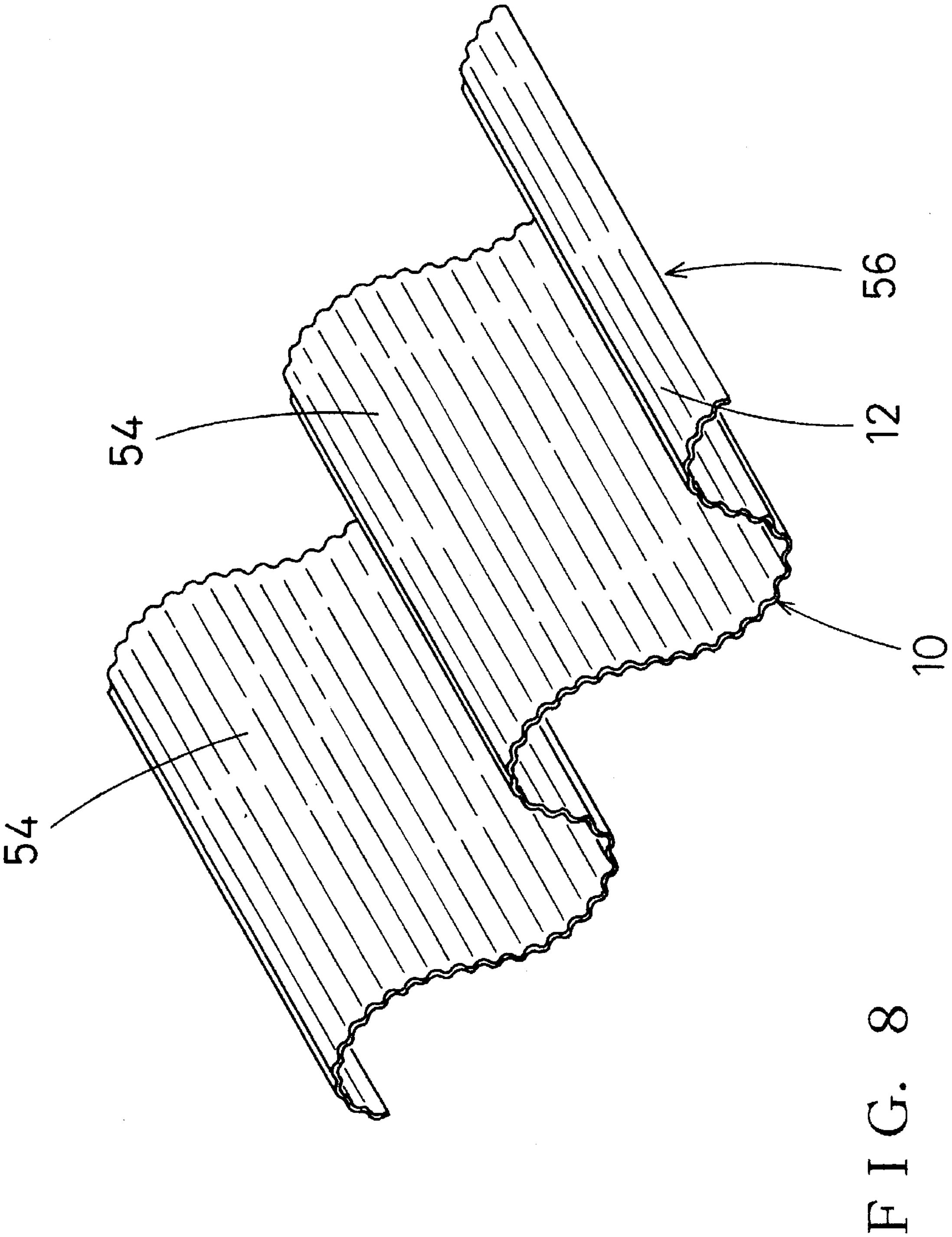
FIG. 8 is a perspective view of another molding corrugated pulp sheet.

This embodiment, however, employs a material having large secondary corrugated portions 54 therein which are formed by further corrugating the molding pulp sheet 10 having the corrugated portions 12 therein to further improve moldability (refer to FIG. 8).

The secondary corrugated portions 54 should be more preferably formed to conform to the concave and convex portions of the upper die 40 or lower die 42.

A second molding corrugated pulp sheet 56 provided with the secondary corrugated portions 54 therein as set forth above has an advantage of being able to be formed into molded goods of deeper drawing by being subjected to heating and pressing.

The other molding processes are carried out substantially the same as those in the first embodiment by way of the pressing machine 26 as described above.

The inventor contemplates with employing two second molding corrugated pulp sheets 56 or molding paper and employing a single second molding corrugated pulp sheet 56.

Fourth Embodiment

Figure 6:
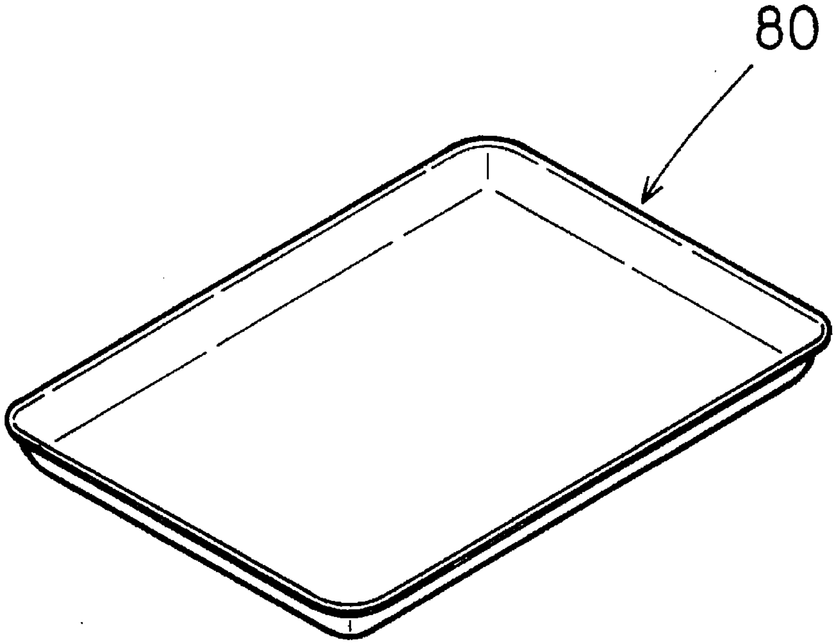
FIG. 6 is a perspective view of another product.

This embodiment relates to a case of manufacturing a so-called bread tray 80 (onto which a customer puts bread he wants to buy from a mass merchandiser) illustrated in FIG. 6.

It has come clear to the inventor that particularly in the case of laminating two, i.e., upper and lower molding corrugated pulp sheets 14 and 14 to mold a bread tray 80 having a large area, for example, of 350 mm in length, 250 mm in width and 30 mm in height, there is the possibility of infiltration of air between the molding corrugated pulp sheets 14 and 14 which can prevent the same from being properly bonded together.

Accordingly, the inventor applied the binding material 22 to some portions of the corrugated portions 12 of the two upper and lower molding corrugated pulp sheets 14 and 14, e.g., the ridge portions thereof, and subjected the molding corrugated pulp sheets 14 and 14 to heating and pressing in order to prevent air from being enclosed therebetween.

The upper and lower molding corrugated pulp sheets 14 and 14 are bonded together, though little, at some portions of the ridges of the upper and lower corrugated portions 12 thereof by applying the binding material 22 to the inner sides of the molding corrugated pulp sheets 14 and 14 at some portions of the corrugated portions 12 thereof.

The upper and lower corrugated portions 12 thus bonded together form slender cylindrical portions which extend in the direction of the ridges and are open at both ends thereof.

As a result, when the upper and lower molding corrugated pulp sheets 14 and 14 are subjected to heating and pressing by way of the pressing machine 26, air introduced therebetween is squeezed out from both ends of the aforementioned cylindrical portions instead of being enclosed therebetween.

This will be described further with reference to FIG. 1. The binding material 22 in the size tank 24 is applied to the inner side of the corrugated portions 12 of the upper molding pulp sheet 10 of the upper and lower molding pulp sheets 10 and 10 by way of the rotating size roller 20, the corrugated portions 12 having been formed in the preceding process.

As a result, when the lower molding corrugated pulp sheet 14 is introduced between the guide rollers 28 and 28, it is pressed against the upper molding corrugated pulp sheet 14 on which the binding material 22 is applied so that the pair of upper and lower molding corrugated pulp sheets 14 and 14 are bonded together though insufficiently to confront each other at the corrugated portions 12 thereof to form slender cylindrical portions which extend in the direction of the ridges of the corrugated portions 12 and are open at both ends thereof.

Thereafter the molding corrugated pulp sheets 14 and 14 are fed to the pressing machine 26 for heating and pressing, when the portions which have been bonded together in the preceding process are further bonded together more securely. Moreover air existing between the upper and lower molding corrugated pulp sheets 14 and 14 is squeezed out by way of the cylindrical portions which have been formed in the preceding process and are open at both ends thereof.

As a result, the upper and lower molding corrugated pulp sheets 14 and 14 are bonded together securely precluding the possibility of coming off.

Fifth Embodiment

Figure 9:
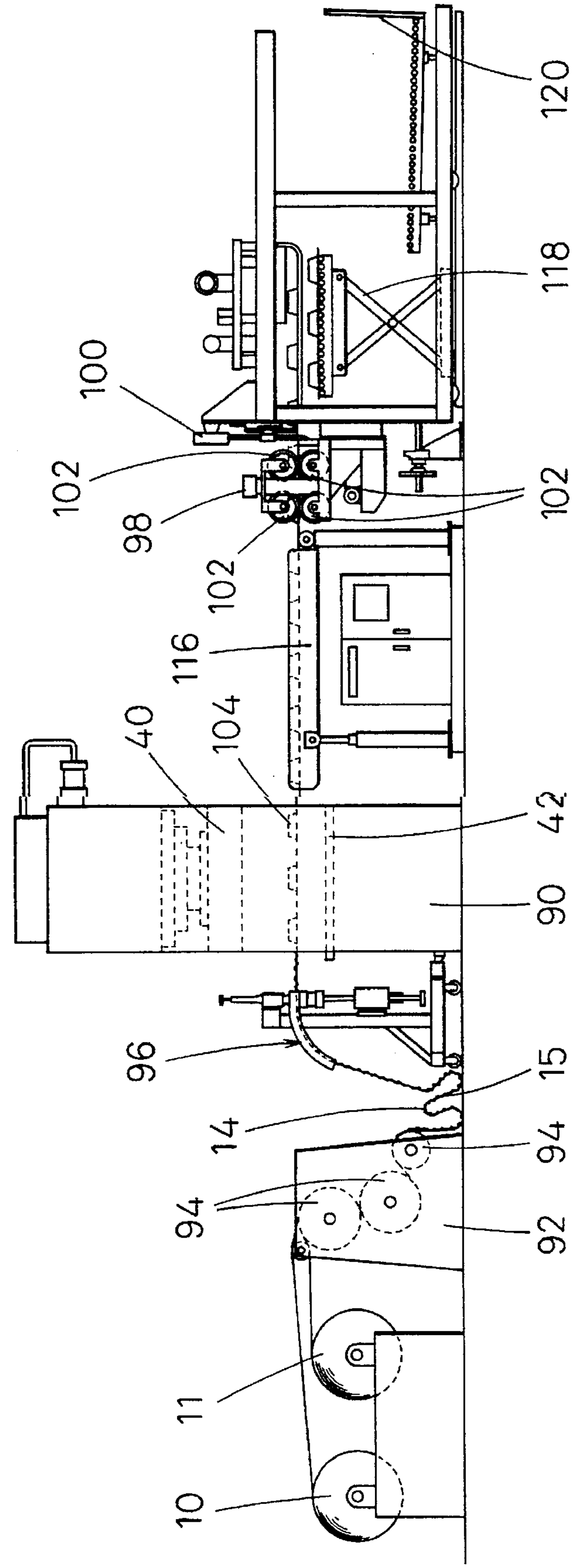
FIG. 9 is a side view of another entire device used in the manufacturing process.

Molding products disclosed in embodiments 5 to 12 are manufactured by a manufacturing system illustrated in FIG. 9.

This does not mean that the manufacturing of the molded goods in the above embodiments is limited to the manufacturing system in FIG. 9. Rather, they may be manufactured by the manufacturing system illustrated in FIG. 1.

Three food trays in a pressing machine 90 are illustrated in FIG. 9, but three additional food trays are present on the rear side thereof (not shown in the figure).

Accordingly, six food trays are manufactured according to this embodiment.

The number of trays manufactured at a time is not, however, to 6 according to the present invention.

The molding corrugated pulp sheet 14 provided with a plurality of corrugated portions 12 therein is manufactured in advance (refer to FIG. 3).

Figure 10:
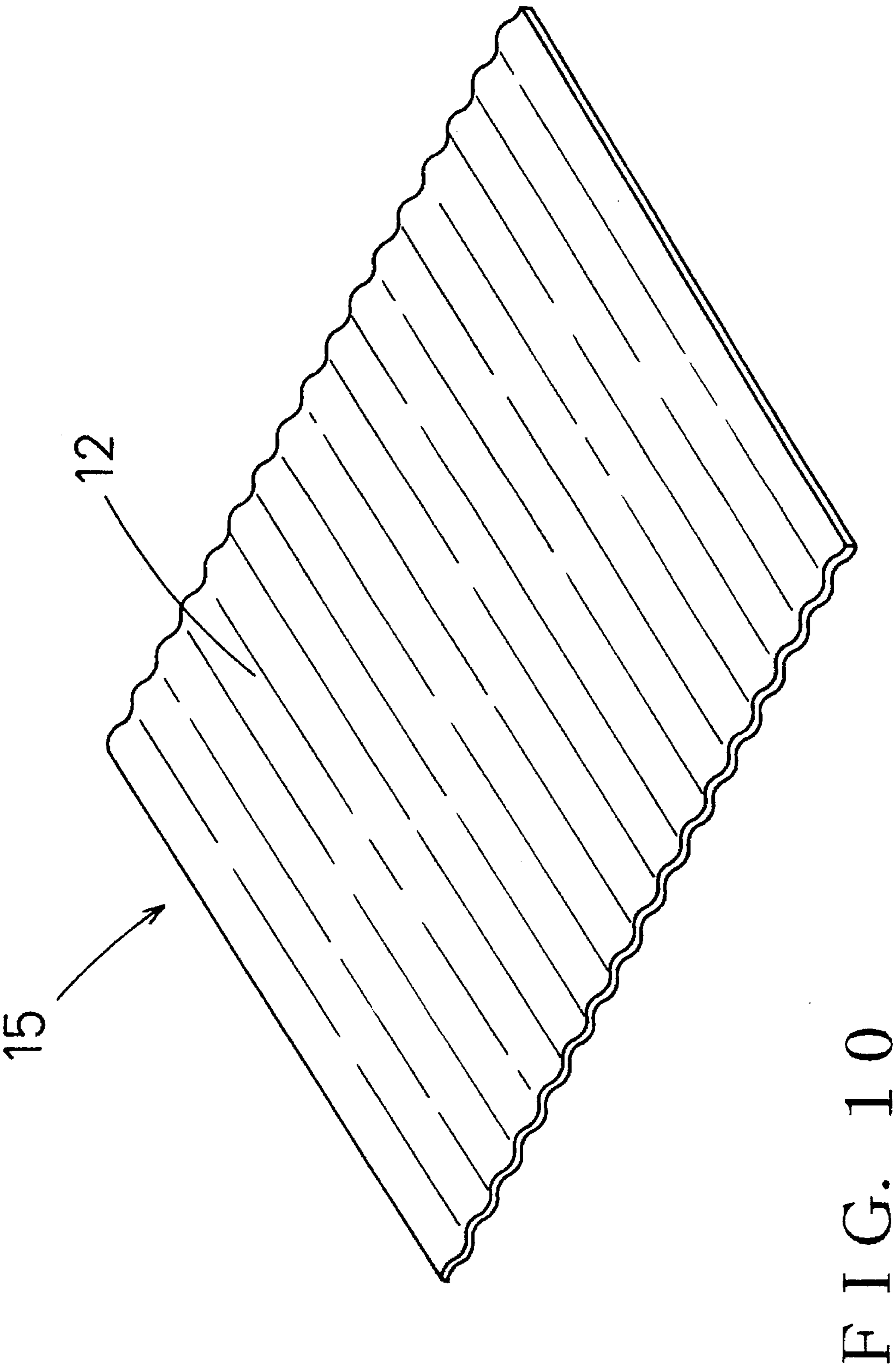
FIG. 10 is a perspective view of a molding corrugated paper.

A molding corrugated paper 15 provided with a plurality of the corrugated portions 12 therein is manufactured in advance in addition to the molding corrugated pulp sheet 14 (refer to FIG. 10).

The manufacturing process of the molding corrugated paper 15 is entirely the same as that of the molding corrugated pulp sheet 14 as described above.

The molding corrugated paper 15 has the advantage of being excellent in rigidity and appearance compared with the molding corrugated pulp sheet 14.

It has, however, the drawback of being susceptible to cracks therein when it is subjected to heating and pressing by way of generation of a forming die.

On the other hand, the molding corrugated pulp sheet 14 has the drawback of being inferior in rigidity and appearance compared with the molding corrugated paper 15, but has the advantage of that fewer cracks are generated therein during working.

Accordingly, two kinds of materials are prepared in this embodiment in order to compensate for the drawbacks of each of the molding corrugated paper 15 and the molding corrugated pulp sheet 14, while retaining the advantages thereof.

The manufacturing process for the molding corrugated paper 15 provided with the corrugated portions 12 therein is similar to that of the molding corrugated pulp sheet 14 provided with the corrugated portions 12 therein.

Molding paper 11 and molding pulp sheet 10 are passed between rollers 94 of a corrugator 92. Each of the rollers 94 has a corrugated surface to form the corrugated portions 12 therein which are corrugated in cross section (refer to FIGS. 3 and 10) before they are subjected to heating and pressing by way of the pressing machine 90 as illustrated in FIG. 9.

In this embodiment, molding paper 11 and molding pulp sheet 10 prepared in rolls before processing are fed to the corrugator 92, in which the molding paper 11 and molding pulp sheet 10 are passed between the rollers 94 having corrugated surfaces to be formed into the molding corrugated paper 15 and molding corrugated pulp sheet 14, respectively, the molding corrugated paper 15 and molding corrugated pulp sheet 14 being provided with a plurality of the corrugated portions 12 which are not restorable to their original shapes at the normal temperature (refer to FIGS. 3, 9 and 10).

It will be easily understood that the provision of the corrugated portions 12 converts the molding paper 11 and molding pulp sheet 10 which are inferior in ductility and malleability into materials comprising the corrugated portions 12 therein which are excellent in ductility and malleability.

Thereafter the molding corrugated pulp sheet 14 is laminated on the molding corrugated paper 15, and the two sheets 14,15 are then fed together to the forming die composed of the upper die 40 and lower die 42 (refer to FIG. 9).

In this case, a guiding mechanism 96 is provided in front of the pressing machine 90 to smoothly feed the molding corrugated pulp sheet 14 and molding corrugated paper 15 to the forming die for molding.

It is preferable to mold the molding corrugated pulp sheet 14 and molding corrugated paper 15 in a slightly slackened state for cracks are liable to generate therein when they are molded in a strained state.

Particularly the material employed in the invention comprises the corrugated portions 12 therein, which, in a manner of speaking, results in a shrunk sheet.

Therefore, the present invention makes use of a feeding mechanism 98, described later, as a means for obtaining the slackened state.

That is, although the feeding mechanism 98 is originally intended to draw the molding corrugated pulp sheet 14 and the molding corrugated paper 15 toward a cutter 100, a roller 102 provided in the feeding mechanism 98 is rotated in reverse to push the molding corrugated pulp sheet 14 and the molding corrugated paper 15 slightly back toward the pressing machine 90 to slacken the molding corrugated pulp sheet 14 and the molding corrugated paper 15 after drawing the same, to obtain the slackened state.

Of course, that the slackening means is not limited to the feeding mechanism 98.

The slackening mechanism can be provided on the side of the guiding mechanism 96 in front of the pressing machine 90.

Hereupon, the molding corrugated pulp sheet 14 and the molding corrugated paper 15 are introduced in a laminated state into the pressing machine 90 composed of the upper die 40 and the lower die 42, where they are subjected to heating and pressing at 120° C. to 180° C.

In this way, a primary product 104 for a food tray is formed, the primary product 104 being composed of the molding corrugated pulp sheet 14 arranged as the upper layer and the molding corrugated paper 15 arranged as the lower layer.

Besides the above embodiments, some contrivances to prevent the molded goods from having cracks generated therein will be described hereinafter (refer to FIG. 5) since the cracks are generated in the case of molding a plurality (a case of six is illustrated in the figure) of products at once.

When the molding corrugated pulp sheet 14 or the molding corrugated paper 15 is subjected to heating and pressing, cracks are often generated therein.

Figure 11:
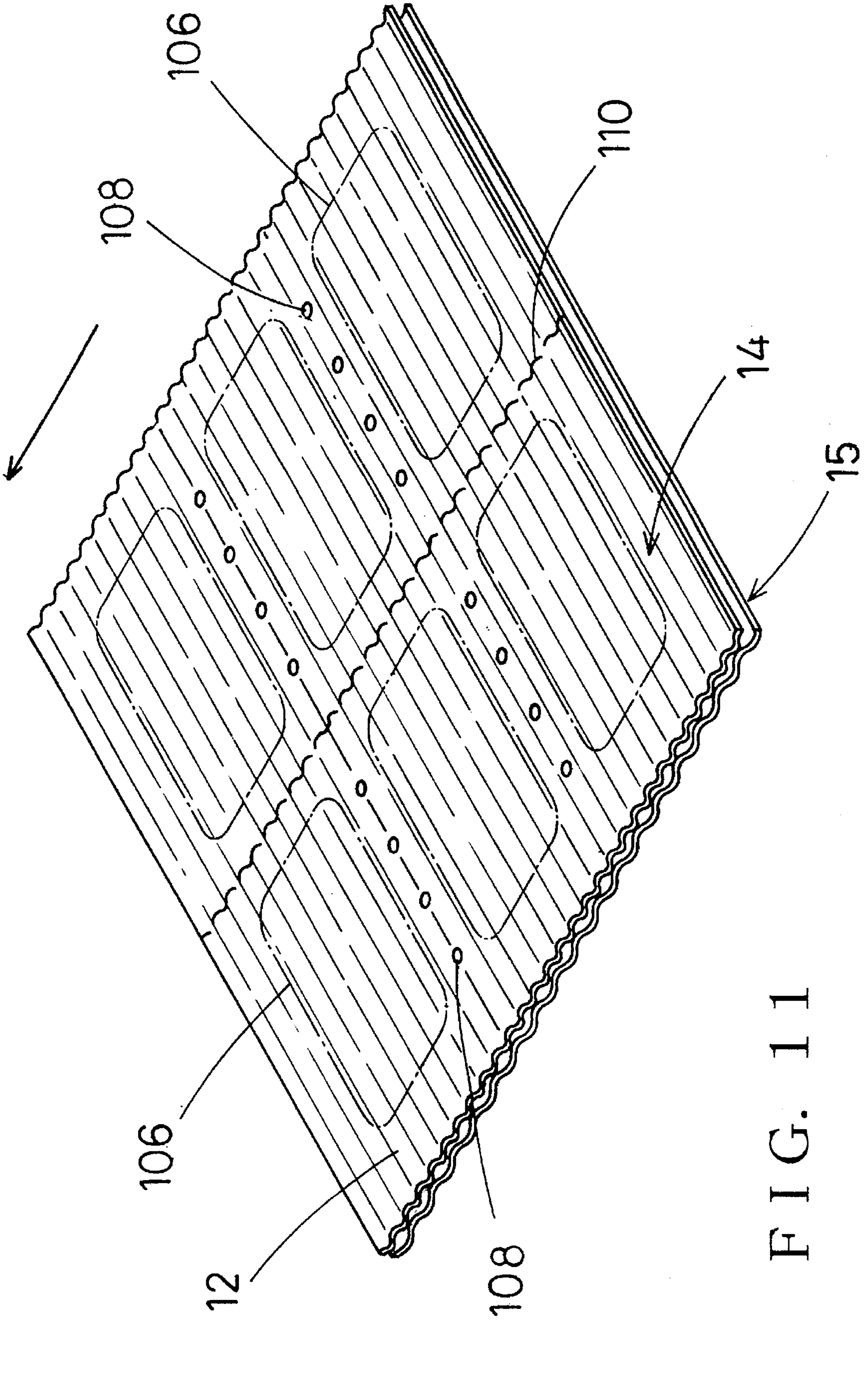
FIG. 11 is a view for describing a molding corrugated pulp sheet and molding corrugated paper each provided with quasi-broken portions therein to be broken first at the time of molding.

According to the present invention, quasi-broken portions 108 are provided between six predetermined molding sections 106 adjacent to one another in the molding corrugated pulp sheet 14 or the molding corrugated paper 15 (referred to as a molding corrugated pulp sheet 14 etc. so long as it is not accompanied by an explanatory note). It is advisable to also provide quasi-broken portions 110 in a direction perpendicular to that of the quasi-broken portions 108 (refer to FIG. 11).

The object and the forming means of the quasi-broken portions 108 and 110 are the same as those described in detail in the first embodiment.

Since the quasi-broken portions 108 and 110 are provided in the molding corrugated pulp sheet 14 etc., stress applied to the molding corrugated pulp sheet 14 etc. by the upper die 40 and the lower die 42 at the time of heating and pressing reaches the fragile quasi-broken portions 108 and 110, which are broken first so that no crack is generated at all in the molded pieces.

It is preferable to form the quasi-broken portions 108 and 110 between the predetermined molding sections 106 along the outline of a circular or elliptical molded. The outline may be linear in the case of a rectangular food tray 112.

The so-called knock pins projecting toward the lower die 42 in a manner similar to the aforementioned perforation pins 41 are provided on the lower surface of the upper die 40 in a manner so as to be elastically forced downward by springs in the same way as in the first embodiment.

The primary product 104 for a food tray is forcibly drawn toward the process by the feeding mechanism 98, and a feeding guide 116 is deliberately provided by the side of the pressing machine 90 for securely feeding the primary product 104 to the next process.

The next process will be described hereinafter.

The primary product 104 for a food tray which has been fed to the side of the next process is cut into 6 food trays by way of the cutter 100 for convenience in the next process, and then it is fed to a lifter 118.

Figure 18:
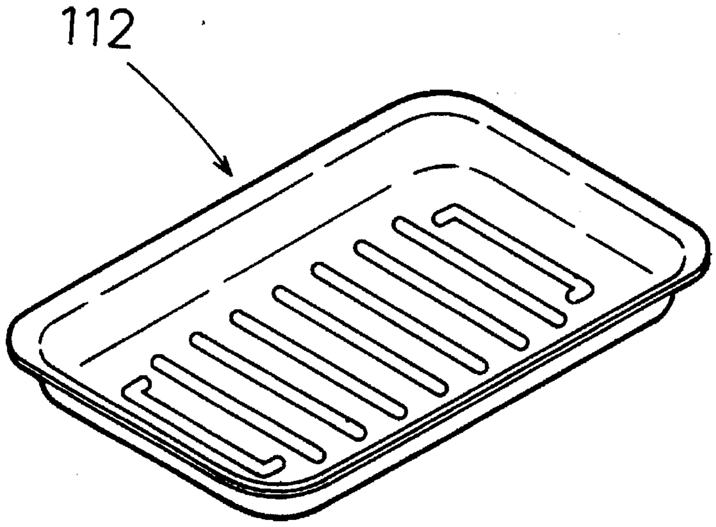
FIG. 18 is a perspective view of a product.

Thereafter the primary product 104 for 6 food trays is loaded on a carriage 120 and is transported to a trimming mechanism, not shown, where it is subjected to a trimming process to be formed into individual food trays 112 which become finished products (refer to FIG. 18).

According to this embodiment, the food tray 112 is composed of the molding corrugated pulp sheet 14 as the upper layer thereof and the molding corrugated paper 15 as the lower layer thereof.

As a result, the tray it the advantage that it is liable to fit the form of the forming die and is less susceptible to cracking since the molding corrugated pulp sheet 14 having pulp fibers extending lengthwise and crosswise therein and being soft in physical property can be easily molded.

It also has the advantage that the soft molding corrugated pulp sheet 14 is reinforced by the lower layer comprising the molding corrugated paper 15 which is excellent in rigidity though inferior in moldability compared with the molding corrugated pulp sheet 14.

Accordingly, it is possible to obtain a product which is less deformed by stress by combining the molding corrugated pulp sheet 14 with the molding corrugated paper 15, though the molding corrugated pulp sheet 14 alone produces a so-called soft molded good which lacks firmness.

The food tray according to the embodiment is not waterproof, but is applicable to foods which do not contain water.

Sixth Embodiment

Figure 12:
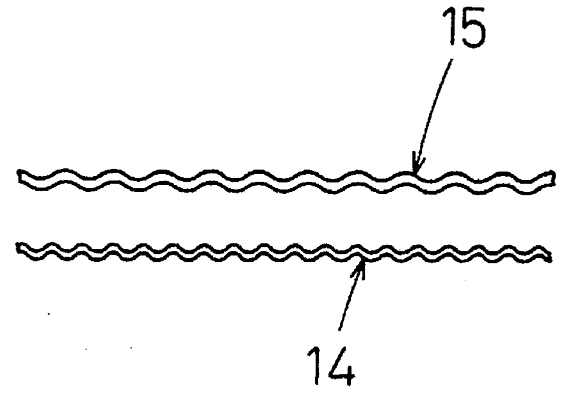
FIG. 12 is a view for explaining a method of molding wherein the molding corrugated paper is laminated on the molding corrugated pulp sheet.

In this embodiment, the vertical arrangement of the molding corrugated pulp sheet 14 and the molding corrugated paper 15 is opposite to that of the fifth embodiment (refer to FIG. 12).

That is, the molding corrugated paper 15 is arranged as the upper layer and the molding corrugated pulp sheet 14 is arranged as the lower layer.

There is no essential difference in the manufacturing processes of the two embodiments.

This embodiment is suited for a food tray which requires a favorable external appearance.

Accordingly, it may be said that this embodiment is based on commercial demand, and results in the molding corrugated paper 15 which is excellent in external appearance being arranged at the surface side of the food tray.

Seventh Embodiment

Figure 13:
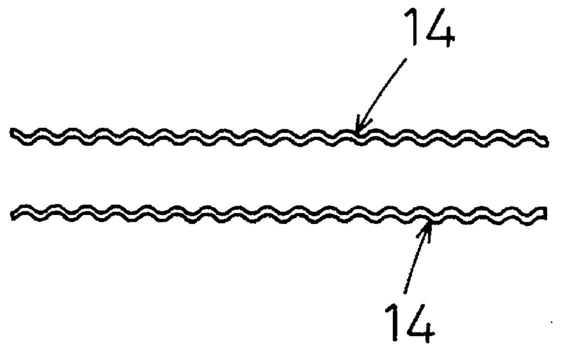
FIG. 13 is a view for explaining a method of molding wherein a molding corrugated pulp sheet is laminated on the other.

Two molding corrugated pulp sheets 14 are laminated to form the upper and lower layers according to this embodiment (refer to FIG. 13).

This embodiment is suited for a product in which external appearance is negligible, for example, a cushioning material for a package, as well as the food tray.

The upper and lower layer molding corrugated pulp sheets 14 which are excellent in moldability are suitable for manufacturing molded goods which must be deep drawn, particularly to a cushioning material for a package since they are superior in softness though inferior in rigidity.

It is a matter of course that there is no difference in the manufacturing process between this embodiment and the other embodiments.

Eighth Embodiment

Figure 14:
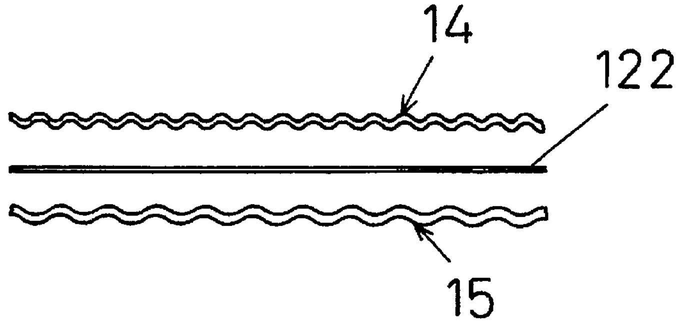
FIG. 14 is a view for explaining a method of molding wherein a plastic film is laminated between an upper molding corrugated pulp sheet and lower molding corrugated paper.

According to this embodiment, a plastic film 122 is laminated between the molding corrugated pulp sheet 14 and the molding corrugated paper 15 of the fifth embodiment (refer to FIG. 14).

In case of the food tray, the molding corrugated pulp sheet 14 is provided as the upper layer and the plastic film 122 is laminated thereunder, so that even if perishable foods containing water are packed therewith, water is absorbed in the molding corrugated pulp sheet 14 which is superior in water absorption properties.

Moreover, water is blocked by the plastic film 122 and does not penetrate into the molding corrugated paper 15 at the lower layer, so that the molding corrugated paper 15 is not affected by water.

As a result, the bottom side of the food tray is prevented from getting wet with water.

There is also no essential difference in the manufacturing method between this embodiment and the first and other embodiments.

The plastic film 122 is laminated between the upper layer molding corrugated pulp sheet 14 and the lower layer molding corrugated paper 15 to be introduced into the forming die for molding.

At that time, the plastic film 122 has also an advantage of serving as bonding material since it generally melts during heating and pressing.

Ninth Embodiment

Figure 15:
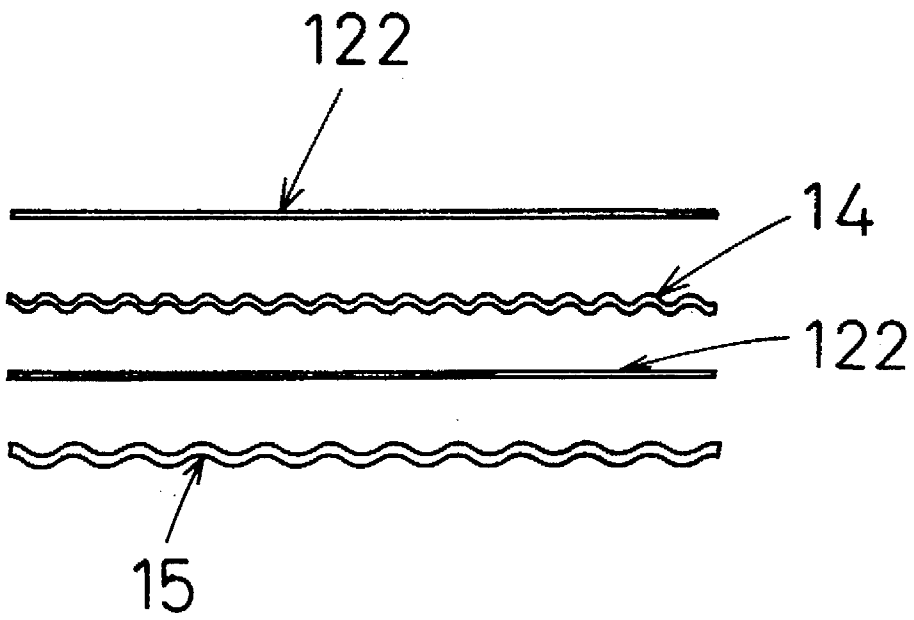
FIG. 15 is a view for explaining a method of molding wherein a plastic film is laminated between an upper molding corrugated pulp sheet and lower molding corrugated paper and wherein another plastic film is laminated on the upper molding corrugated pulp sheet.

In this embodiment, an additional plastic film 122 is laminated on the upper molding corrugated pulp sheet 14 of the eighth embodiment (refer to FIG. 15).

As described above in the case of the food tray according to this embodiment, water which penetrates into the food tray from the bottom side thereof is blocked by the plastic film 122 laminated between the molding corrugated pulp sheet 14 and the molding corrugated paper 15.

Water which would otherwise penetrate into the food tray from the upper side thereof is blocked by the plastic film 122 laminated on the upper molding corrugated pulp sheet 14.

As a result, the food tray according to this embodiment can be used on a wet place and is suited for perishable foods.

Incidentally in this embodiment, it is preferable to keep the upper die 40 at a lower temperature compared with the preceding embodiments, since the upper die 40 is brought into contact with another plastic film 122 further laminated on the upper molding corrugated pulp sheet 14, and because the plastic film 122 should be prevented from melting at a high temperature.

Accordingly, the upper die 40 is kept at a temperature lower than the melt temperature of the molding process.

Tenth Embodiment

Figure 16:
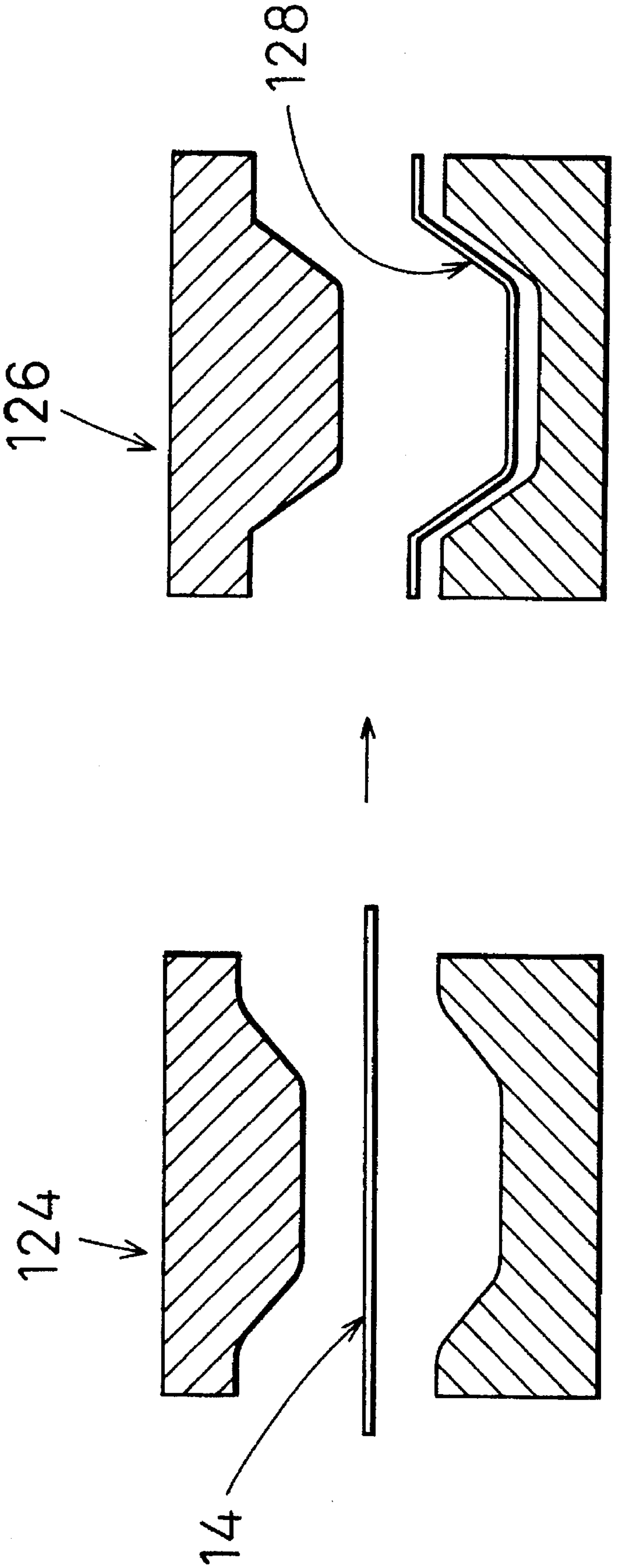
FIG. 16 is a schematic cross section of a device for use in another method of molding.

This is a method of molding a product which must be more deeply drawn as illustrated in FIG. 16.

Incidentally, this embodiment is suited for molding a product having a diameter of about 300 mm made of the aforementioned materials, such as a large dish.

This embodiment is fundamentally different than manufacturing method of the first embodiment.

This embodiment is different from the first embodiment because it performs the heating and pressing process twice, whereas this is performed only once in the first embodiment.

That is, at least a molding corrugated pulp sheet 14 or a molding corrugated paper 15 is subjected to preliminary molding by way of heating and pressing by using a primary forming die 124 having a comparatively large clearance and, thereafter, is subjected to finish molding by heating and pressing using a secondary forming die 126 having less clearance.

As described above, the molding corrugated pulp sheet 14 or the molding corrugated paper 15 is formed into a roughly-formed product by the preliminary molding and is further formed into molded goods 128 which are deeply drawn according to a predetermined standard by finish molding.

Eleventh Embodiment

Figure 17:
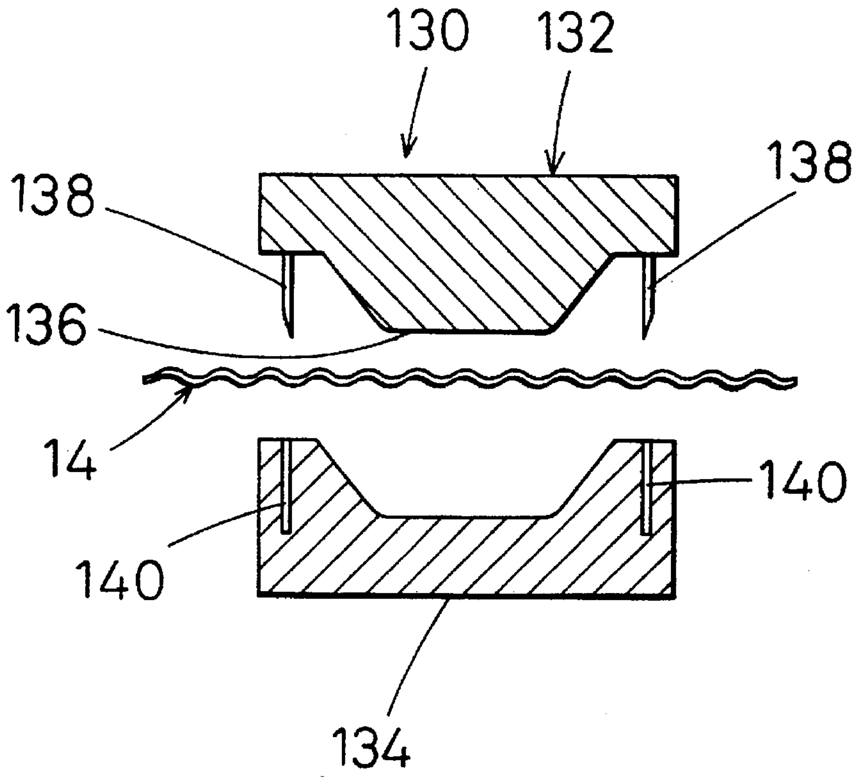
FIG. 17 is a schematic cross section of a device for use in still another method of molding.

This embodiment is shown in FIG. 17.

The method of this embodiment comprises the step of cutting off the predetermined outline portions of the molded goods from the material before molding the same by a forming die 130.

A concrete example of a device for performing the aforementioned method will be described hereinafter.

A cutter 138 projects from the peripheral portion of an upper forming die 132 toward a lower forming die 134 so as to project below the lower surface 136 of the upper forming die 132.

Of course, the outline of the cutter 138 corresponds to the outline of the molded good.

Needless to say, the number of the cutters 138 attached to the upper forming die 132 corresponds to the number of the molded goods.

On the other hand, a groove 140 for receiving the cutter 138 therein is provided at the peripheral portion of the lower forming die 134.

As a result, when a molding corrugated pulp sheet 14 or a sheet of molding corrugated paper is introduced between the upper forming die 132 and the lower forming die 134 for molding, the upper forming die 132 lowers toward the lower forming die 134 and the sheet is cut first along the predetermined outline of the mold good to separate the portions thereof to become the molded goods from the outer surplus portions thereof before the lower surface 136 of the upper forming die 132 is brought into contact with the lower forming die 134.

Then the predetermined portion of the sheet to be molded into the molded good is separated from the surplus portion of the sheet and is molded by the forming die 130.

Accordingly, molded goods which are deeply drawn and of excellent quality can be obtained according to this method of molding since it is possible to remarkably reduce the load which is applied to the predetermined portion of the sheet to be molded into the molded good by mechanical expression even if a plurality of the molded goods are formed at one time.

This embodiment is different from the preceding embodiments in that the predetermined portions of the molding corrugated pulp sheet 14 or the molding corrugated paper to be molded into the molded goods are separated beforehand from the surplus portions thereof.

As a result, the molded goods remain in the forming die 130 to be removed after molding.

As a means for removing the mold goods, a suction cup coupled to an air hose is used for transporting the molded goods to any destination. The molded goods can be held by suction cup by supplying air thereto or released from the suction cup by stopping the supply of air thereto.

Since the molded good is separated from the molding corrugated pulp sheet 14 or the molding corrugated paper with certainty according to this embodiment, there is no need for the so-called trimming process along the outline of the molded good as in the preceding embodiments though the surplus portions of the sheet have to be collected separately from the molded goods.

Twelfth Embodiment

Other than the aforementioned embodiments, further modifications will be additionally described hereinafter.

Although the above embodiments employed the molding pulp sheet and the molding paper in a rolled state, it is a matter of course that the present invention can also employ those of so-called sheet-type (non-rolled state).

The difference between them is no more than a difference in manufacturing technology and not a difference in the essence of the invention.

Although the upper die 40 lowers toward the lower die 42 in the above descriptions, the inventor also conducted an experiment wherein the lower die 42 moves toward the upper die 40.

I claim:

1. A method of simultaneously manufacturing a plurality of molded goods, comprising the steps of:

providing a molding sheet comprising at least one of a pulp sheet and a paper sheet and having a plurality of predetermined molding sections to respectively form the plurality of molded goods;

forming quasi-broken portions between adjacent pairs of said predetermined molding sections of said molding sheet; and subjecting said molding sheet to heating and pressing to mold said predetermined molding sections of said molding sheet into predetermined shapes.

2. A method as recited in claim 1, further comprising separating said predetermined molding sections of said molding sheet into molding pieces; and trimming peripheries of said molding pieces to form the molded goods.

3. A method as recited in claim 1, wherein said step of providing a molding sheet comprises providing a corrugated molding sheet.

4. A method as recited in claim 3, wherein said step of providing said corrugated molding sheet comprises providing said molding sheet in a non-corrugated state, and corrugating said molding sheet.

5. A method as recited in claim 1, wherein said step of providing a molding sheet comprises providing a corrugated paper sheet.

6. A method as recited in claim 1, wherein said step of providing a molding sheet comprises providing a corrugated pulp sheet.

7. A method as recited in claim 1, wherein said step of providing said molding sheet comprises providing a first sheet comprising one of a pulp sheet and a paper sheet, providing a second sheet comprising one of a pulp sheet and a paper sheet, and laminating said first and second sheets together.

8. A method as recited in claim 7, further comprising corrugating each of said first and second sheets before said first and second sheets are laminated together.

9. A method as recited in claim 1, wherein said step of providing said molding sheet comprises providing a corrugated molding paper sheet, providing a corrugated molding pulp sheet, and laminating said corrugated molding paper sheet and said corrugated molding pulp sheet together.

10. A method as recited in claim 9, wherein said step of providing said molding sheet further comprises interposing a plastic film between said corrugated molding paper sheet and said corrugated molding pulp sheet before said corrugated molding paper sheet and said corrugated molding pulp sheet are laminated together.

11. A method as recited in claim 10, further comprising laminating another plastic film on a surface of said molding corrugated pulp sheet opposite the surface thereof facing said corrugated molding paper sheet.

12. A method as recited in claim 1, wherein said step of providing said molding sheet comprises providing a first corrugated molding pulp sheet, providing a second corrugated molding pulp sheet, and laminating said first corrugated molding pulp sheet and said second corrugated molding pulp sheet together.

13. A method as recited in claim 1, wherein said step of providing said molding sheet comprises providing a corrugated molding sheet having primary corrugations and secondary corrugations, said secondary corrugations being larger in cross section than said primary corrugations.

14. A method as recited in claim 1, wherein said step of subjecting the molding sheet to heating and pressing to mold said predetermined molding sections of said molding sheet into predetermined shapes comprises subjecting said molding sheet to a preliminary heating and pressing process using a primary forming die to form said predetermined molding sections into preliminary shapes, and then subjecting said molding sheet to a finishing heating and pressing process using a secondary forming die to form said predetermined molding sections into said predetermined shapes.

15. A method as recited in claim 1, wherein said step of providing said molding sheet comprises providing a first sheet comprising one of a pulp sheet and a paper sheet, providing a second sheet comprising one of a pulp sheet and a paper sheet, and laminating said first and second sheets together; and said laminating of said first and second sheets includes coating ridge portions of one of said first and second sheets and then abutting the ridge portions against the other of said first and second sheets.

16. A method as recited in claim 1, further comprising cutting said molding sheet, just prior to said step of heating and pressing, to separate said predetermined molding sections from one another.

* * * * *